(12) United States Patent
Zhang et al.

(10) Patent No.: US 12,739,447 B2
(45) **Date of Patent: *Sep. 15, 2026**

(54) EFFECT DISPLAY METHOD, APPARATUS AND DEVICE, STORAGE MEDIUM, AND PRODUCT

(71) Applicant: Beijing Bytedance Network Technology Co., Ltd., Beijing (CN)

(72) Inventors: Pengwei Zhang, Beijing (CN); Cong Ye, Beijing (CN); Shiting Zhou, Beijing (CN); Xuan Guo, Beijing (CN); Bifu Li, Beijing (CN); Weijian Xu, Beijing (CN); Enjie Zhou, Beijing (CN); Xingjian Sun, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,813

(22) Filed: Sep. 16, 2024

(65) Prior Publication Data

US 2025/0088679 A1 Mar. 13, 2025

Related U.S. Application Data

(63) Continuation of application No. 18/481,420, filed on Oct. 5, 2023, now Pat. No. 12,096,047, which is a (Continued)

(30) Foreign Application Priority Data

Apr. 6, 2021 (CN) ......................... 202110369428.3

(51) Int. Cl.

*H04N 21/2187* (2011.01)
*H04N 21/414* (2011.01)
*H04N 21/472* (2011.01)

(52) U.S. Cl.

CPC ... *H04N 21/2187* (2013.01); *H04N 21/41407* (2013.01); *H04N 21/472* (2013.01)

(58) Field of Classification Search

CPC ......... H04N 21/2187; H04N 21/41407; H04N 21/4316; H04N 21/4788; H04N 21/472; G06T 13/00

See application file for complete search history.

(56) References Cited

U.S. PATENT DOCUMENTS

2017/0256288 A1* 9/2017 Ai ........................ G11B 31/006
2018/0124477 A1* 5/2018 Qu ..................... H04N 21/8547
(Continued)

FOREIGN PATENT DOCUMENTS

CN 106131591 A 11/2016
CN 106846040 A 6/2017
(Continued)

OTHER PUBLICATIONS

China National Intellectual Property Administration, Office Action and Search Report Issued in Application No. 202110369428.3, Sep. 21, 2022, 24 pages. (Submitted with partial English translation).
(Continued)

*Primary Examiner* — Alazar Tilahun
(74) *Attorney, Agent, or Firm* — Alleman Hall LLP

(57) ABSTRACT

Embodiments of the present disclosure provide an effect display method, apparatus and device, a storage medium, and a product. The method includes: acquiring an effect trigger instruction, the effect trigger instruction corresponding to a first image frame in a streaming media content of a live stream room, and the effect trigger instruction also corresponding to first effect information; in response to the effect trigger instruction, determining target effect information according to the first effect information and a target object in the first image frame; and sending the target effect (Continued)

information to a first client device associated with the live stream room, so that the first client device displays an effect corresponding to the target effect information.

14 Claims, 10 Drawing Sheets

Related U.S. Application Data continuation of application No. PCT/CN2022/085302, filed on Apr. 6, 2022.

(56) References Cited

U.S. PATENT DOCUMENTS

| | | | |
|---|---|---|---|
| 2019/0132642 | A1 | 5/2019 | Wang et al. |
| 2021/0099735 | A1 | 4/2021 | Shirai et al. |

FOREIGN PATENT DOCUMENTS

| | | | |
|---|---|---|---|
| CN | 107682729 | A | 2/2018 |
| CN | 107911724 | A | 4/2018 |
| CN | 109194973 | A | 1/2019 |
| CN | 109391834 | A | 2/2019 |
| CN | 110418155 | A | 11/2019 |
| CN | 110475150 | A | 11/2019 |
| CN | 110493630 | A | 11/2019 |
| CN | 110536151 | A | 12/2019 |
| CN | 110730374 | A | 1/2020 |
| CN | 110784730 | A | 2/2020 |
| CN | 111010585 | A | 4/2020 |
| CN | 111107384 | A | 5/2020 |
| CN | 111182320 | A | 5/2020 |
| CN | 111277854 | A | 6/2020 |
| CN | 111464828 | A | 7/2020 |
| CN | 111541909 | A | 8/2020 |
| CN | 111669612 | A | 9/2020 |
| CN | 111698523 | A | 9/2020 |
| CN | 111901624 | A | 11/2020 |
| CN | 112261424 | A | 1/2021 |
| CN | 112307925 | A | 2/2021 |
| CN | 112584224 | A | 3/2021 |
| EP | 4246986 | A1 | 9/2023 |
| JP | 2019198060 | A | 11/2019 |
| JP | 2020088838 | A | 6/2020 |
| JP | 6783919 | B1 | 11/2020 |
| JP | 2021033980 | A | 3/2021 |

OTHER PUBLICATIONS

China National Intellectual Property Administration, Office Action and Search Report Issued in Application No. 202110369428.3, Jan. 11, 2023, 10 pages. (Submitted with Concise Explanation of Relevance).

China National Intellectual Property Administration, Office Action and Search Report Issued in Application No. 202110369428.3, Mar. 21, 2023, 13 pages. (Submitted with Concise Explanation of Relevance).

European Patent Office, Extended European Search Report Issued in Application No. 22784045.1, Jul. 17, 2024, Germany, 9 pages.

ISA China National Intellectual Property Administration, International Search Report and Written Opinion Issued in Application No. PCT/CN2022/085302, Jun. 24, 2022, 15 pages.

Chang, J. et al., "Network Live Broadcasting from the Perspective of New Media," China Academic Journal Electronic Publishing House, Jun. 2018, 4 pages.

China National Intellectual Property Administration, Notification of Grant Issued in Application No. 202110369428.3, Jun. 15, 2023, 5 pages. (Submitted with partial English translation).

Japan Patent Office, Office Action Issued in Application No. 2023561379, Nov. 19, 2024, 9 pages.

* cited by examiner

EFFECT DISPLAY METHOD, APPARATUS AND DEVICE, STORAGE MEDIUM, AND PRODUCT

CROSS-REFERENCE TO RELATED APPLICATIONS

The application is a continuation of U.S. patent application Ser. No. 18/481,420, filed on Oct. 5, 2023, which is a continuation of International Application No. PCT/CN2022/085302, filed on Apr. 6, 2022, which claims priority to Chinese Patent Application No. 202110369428.3, filed on Apr. 6, 2021, entitled "Effect Display Method, Apparatus and Device, Storage Medium, and Product". The above applications are incorporated herein by reference in their entireties.

TECHNICAL FIELD

Embodiments of the present disclosure relate to the technical field of data processing, and in particular, to an effect display method, apparatus and device, storage medium, and product.

BACKGROUND

With continuous progress of network technology, network live stream has gradually entered lives of users. The network live stream refers to the real-time transmission of one's own video and audio images to everyone on the Internet through the terminal for watching. During the live stream, the users can present a virtual object to a live streamer user, and each virtual object corresponds to corresponding effect information, or the live streamer users can select different effects to use during the live stream.

SUMMARY

Embodiments of the present disclosure provide an effect display method, apparatus and device, storage medium, computer program product, and computer program.

In a first aspect, an embodiment of the present disclosure provides an effect display method, including:

- acquiring an effect trigger instruction, the effect trigger instruction corresponding to a first image frame in a streaming media content of a live stream room, and the effect trigger instruction also corresponding to first effect information;
- in response to the effect trigger instruction, determining target effect information according to the first effect information and a target object in the first image frame; and
- sending the target effect information to a first client device associated with the live stream room, so that the first client device displays an effect corresponding to the target effect information.

In a second aspect, an embodiment of the present disclosure provides an effect display method, including:

- displaying a streaming media content of a live stream room;
- in response to detection of an effect trigger operation, determining first time information corresponding to the effect trigger operation, and determining first effect information corresponding to the effect trigger operation;
- sending an effect trigger instruction to a server, the effect trigger instruction indicating the first effect information, and the effect trigger instruction also indicating a first image frame corresponding to the first time information in the streaming media content of the live stream room;
- acquiring an effect display instruction from the server, the effect display instruction indicating target effect information, and the target effect information being associated with the first effect information and a target object in the first image frame; and
- displaying an effect corresponding to the target effect information.

In a third aspect, an embodiment of the present disclosure provides an effect display method, including:

- pushing a streaming media content to a first client device and a second client device associated with a live stream room;
- acquiring an effect trigger instruction from the first client device, where the effect trigger instruction indicates target effect information, and the target effect information is associated with first effect information and a target object in a first image frame in the streaming media content, the first effect information includes effect information corresponding to an effect trigger operation detected by the first client device, the effect trigger operation corresponds to first time information, and the first image frame includes an image frame corresponding to the first time information in the streaming media content of the live stream room; and
- sending the target effect information to the second client device, so that the second client device displays an effect corresponding to the target effect information.

In a fourth aspect, an embodiment of the present disclosure provides an effect display apparatus, including:

- an acquiring module, configured to acquire an effect trigger instruction, the effect trigger instruction corresponding to a first image frame in a streaming media content of a live stream room, and the effect trigger instruction also corresponding to first effect information;
- a determining module, configured to determine, in response to the effect trigger instruction, target effect information according to the first effect information and a target object in the first image frame; and
- a sending module, configured to send the target effect information to a first client device associated with a live stream room, so that the first client device displays an effect corresponding to the target effect information.

In a fifth aspect, an embodiment of the present disclosure provides an effect display apparatus, including:

- a content displaying module, configured to display a streaming media content of the live stream room;
- an effect determining module, configured to determine, in response to detection of an effect trigger operation, first time information corresponding to the effect trigger operation, and determine first effect information corresponding to the effect trigger operation;
- an instruction sending module, configured to send an effect trigger instruction to a server, the effect trigger instruction indicating the first effect information, and the effect trigger instruction also indicating a first image frame corresponding to the first time information in the streaming media content of the live stream room;
- an instruction acquiring module, configured to acquire an effect display instruction from the server, the effect display instruction indicating target effect information, and the target effect information being associated with the first effect information and a target object in the first image frame; and an effect displaying module, configured to display the effect corresponding to the target effect information.

In a sixth aspect, the embodiments of the present disclosure provide an effect display apparatus, including:

a content pushing module is configured to push the streaming media content to a first client device and a second client device associated with the live stream room;

an instruction acquiring module is configured to acquire an effect trigger instruction from the first client device, the effect trigger instruction indicating target effect information, and the target effect information is associated with first effect information and a target object in a first image frame in the streaming media content. The first effect information includes effect information corresponding to effect trigger operation detected by the first client device. The effect trigger operation corresponds to the first time information, and the first image frame includes an image frame corresponding to the first time information in the streaming media content; and a target effect sending module is configured to send the target effect information to the second client device, so that the second client device displays the effect corresponding to the target effect information.

In a seventh aspect, the embodiments of the present disclosure provide an effect display device, including:

a memory and a processor;

the memory is configured to store computer instructions; and the processor is configured to execute the computer instructions stored in the memory, so that the effect display device implements the effect display method according to the first aspect or the second aspect or the third aspect.

In an eighth aspect, an embodiment of the present disclosure provides a computer-readable storage medium, where the computer-readable storage medium stores computer-executable instructions, and when the computer-executable instructions are executed by a computing device, the computing device implements the effect display method according to the first aspect or the second aspect or the third aspect.

In a ninth aspect, an embodiment of the present disclosure provides a computer program product, including a computer program that, when executed by a processor, implements the effect display method according to the first aspect or the second aspect or the third aspect.

In a tenth aspect, an embodiment of the present disclosure provides a computer program that, when executed by a processor, implements the effect display method according to the first aspect or the second aspect or the third aspect.

BRIEF DESCRIPTION OF THE DRAWINGS

In order to illustrate the technical solutions in the embodiments of the present disclosure or in the prior art more clearly, a brief introduction will be given to the accompanying drawings required in the description of the embodiments or prior art. Obviously, the accompanying drawings in the following description are some embodiments of the present disclosure, and for those of ordinary skill in the art, other drawings can also be acquired from these drawings without any creative effort.

DESCRIPTION OF EMBODIMENTS

In order to make the purposes, technical solutions and advantages of the embodiments of the present disclosure clearer, the technical solutions in the embodiments of the present disclosure will be described clearly and completely below with reference to the accompanying drawings in the embodiments of the present disclosure. Obviously, the described embodiments are some of, but not all, embodiments of the present disclosure. According to the embodiments in the present disclosure, all other embodiments acquired by those of ordinary skill in the art without creative work fall within the protection scope of the present disclosure.

In view of the above-mentioned problem that an effect fusion method in the related live stream process will block a fused effect and cannot fully display the effect information, the present disclosure provides an effect display method, apparatus, and device, storage medium and product.

It should be noted that the effect display method, apparatus and device, storage medium and product provided by the present disclosure can be used in various scenes of effect display of virtual objects in a live stream room.

In the related art, when an effect is triggered, a fusion operation of the effect and a live stream content is generally implemented on a live streamer user side. Specifically, image data of a live stream may be acquired at the live streamer user side, and the image data can be fused with the effect. The fused data is sent to a live stream-watching user side for display in the form of a video stream. However, when the above-mentioned method is used for effect fusion, the fused effect will be blocked and the effect information cannot be completely displayed because when the fused data sent from the live streamer user side is played on the live stream-watching user side, data such as comments and live stream room notifications will be on the interface at the same time.

In order to solve the above technical problem, the inventor found through research that it is possible to generate an effect trigger instruction corresponding to the first image frame and the first effect information, synthesize the target effect information on the client device side or the server side according to the effect trigger instruction, and send the target effect information to the first client device associated with the live stream room to display. In this way, it is not necessary to perform an effect fusion operation on the live streamer's terminal device, but only needs to determine the first image frame and the first effect information, and then the synthesis of the target effect information and the display of effect corresponding to the target effect information can be realized on the client device or server, and also the data in the live stream room will not block the effect corresponding to the target effect information.

Figure 1:
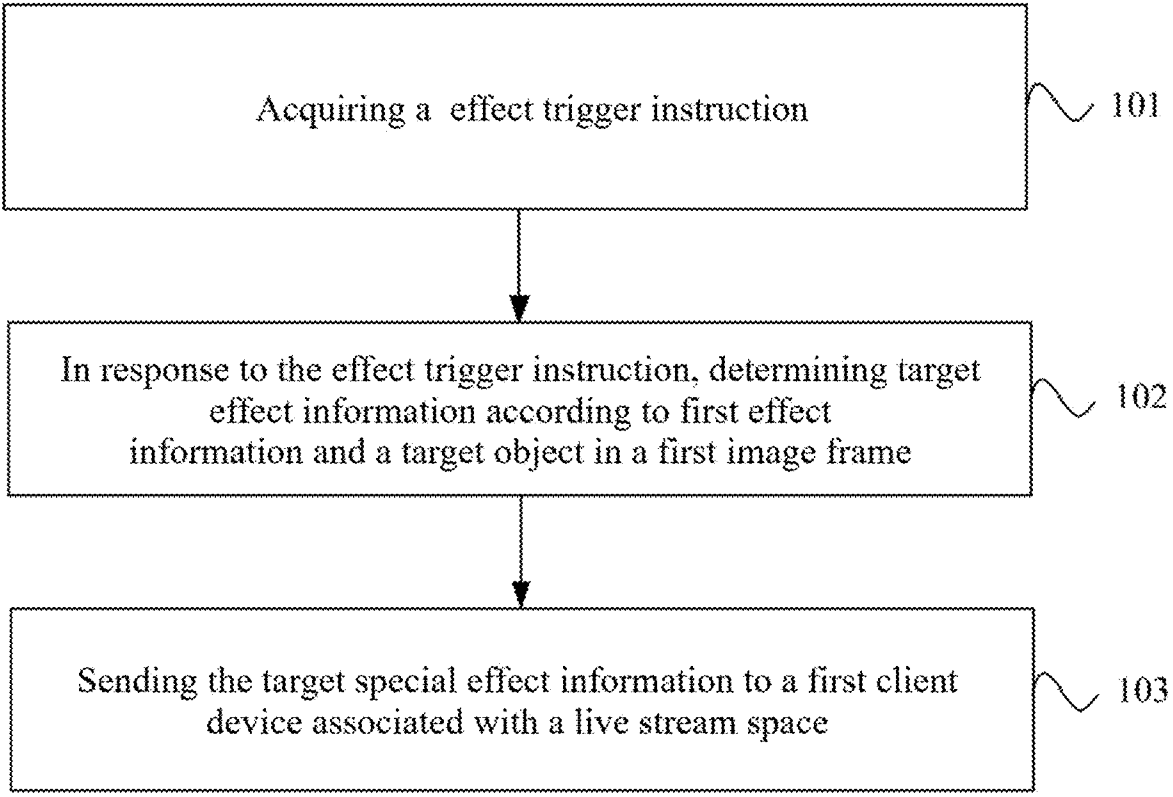
FIG. 1 is a schematic flowchart of an effect display method provided in Embodiment 1 of the present disclosure.

FIG. 1 is a schematic flowchart of an effect display method provided in Embodiment 1 of the present disclosure. As shown in FIG. 1, the method includes steps 101, 102, and 103.

Step 101: acquiring an effect trigger instruction, the effect trigger instruction corresponding to a first image frame in a streaming media content of a live stream room, and the effect trigger instruction also corresponding to first effect information.

An executive entity of the present embodiment is an effect display apparatus, which may be coupled into a client device or a server. The present disclosure has no limitation on this.

In the present embodiment, in order to achieve the display of an effect, an effect trigger instruction may be acquired first, and specifically the effect trigger instruction may be generated after detecting that a live stream-watching user presents a virtual object to a target live streamer corresponding to a live stream room. Alternatively, the effect trigger instruction may also be generated by the target live streamer user to trigger an effect according to an actual need.

Specifically, the effect trigger instruction may correspond to the first image frame in the streaming media content of the live stream room, and the streaming media content may specifically be live video data of the target live streamer user, and is sent to the client device in the form of streaming media for display. In addition, the effect trigger instruction also corresponds to the first effect information. Taking the example above as an example, the first effect information may be the effect information corresponding to a virtual object, and the first effect information may also be the effect information corresponding to the effect triggered by the target live streamer user according to actual needs. Where, the live stream room is a virtual space with interconnected relationships.

Step 102: in response to the effect trigger instruction, determining target effect information according to the first effect information and a target object in the first image frame.

In the present embodiment, after acquiring the effect trigger instruction, in response to the effect trigger instruction, a fusion operation may be performed according to the first effect information and the first image frame to acquire target effect information.

Specifically, an image recognition operation may be performed on the first image frame to acquire a target object corresponding to the first image frame, and the first effect information may be fused with the target object to acquire the target effect information.

Alternatively, the first effect information may also be fused to a preset position in the first video frame or a position designated by the user to acquire the target effect information. The present disclosure has no restriction on this.

Step 103: sending the target effect information to a first client device associated with the live stream room, so that the first client device displays an effect corresponding to the target effect information.

In the present embodiment, after the target effect information is generated, the target effect information may be sent to the first client device. Where, the first client device may specifically be a client device of a watcher in the live stream room. Correspondingly, the first client device can display the effect corresponding to the target effect information after acquiring the target effect information.

Where, the target effect information may be the fused effect information, or a set of data including the first effect information and the target object (target object information). Therefore, the first client device may display the effect corresponding to the target effect information. In an example, the target effect information is synthesized according to the first effect information and target object information corresponding to the target object in the first image frame, or the target effect information is a set of data including the first effect information and the target object information. The target object information is information related to the target object, such as image information corresponding to the target object.

In the effect display method provided by the present embodiment, after acquiring the effect trigger instruction, the target effect information is generated according to the first image frame and the first effect information in the streaming media content of the live stream room corresponding to the effect trigger instruction, and the target effect information is sent to the first client device associated with the live stream room, so that the first client device displays the effect corresponding to the target effect information. In this way, it is not necessary to perform an effect fusion operation on the live streamer's terminal device, and only needs to determine the first image frame and the first effect information, and then the synthesis of the target effect information and the display of the effect corresponding to the target effect information can be realized on the client device or server, and also the data in the live stream room will not block the effect corresponding to the target effect information.

Further, on the basis of Embodiment 1, before Step 101, it further includes:

in response to detection of the effect trigger operation, determining first time information corresponding to the effect trigger operation; determining the first image frame corresponding to the first time information in the streaming media content of the live stream room; determining the first effect information corresponding to the effect trigger operation.

Figure 2:
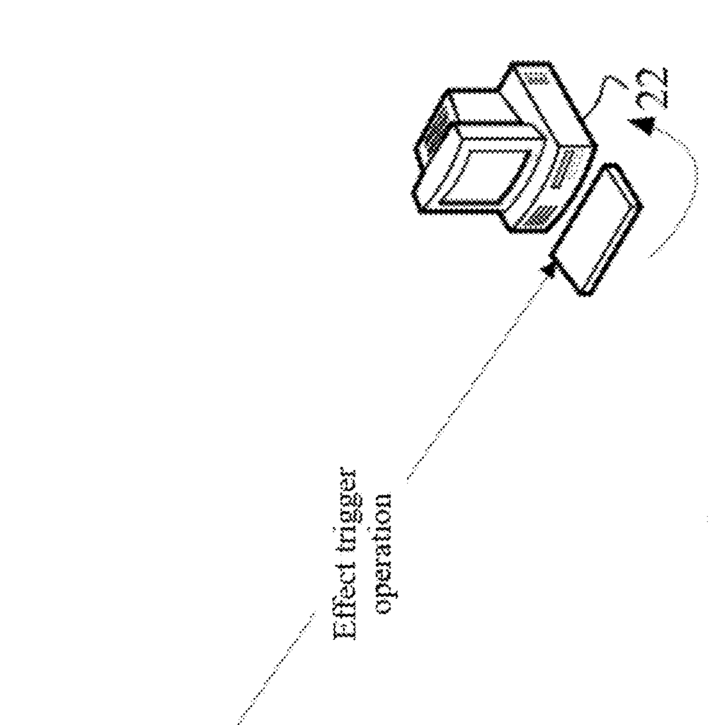
FIG. 2 is a system architecture diagram on which an embodiment of the present disclosure is based.
Figure 2:
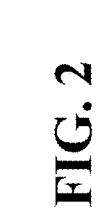

FIG. 2 is a system architecture diagram on which the present embodiment is based. As shown in FIG. 2, the system architecture includes a live streamer client device 21 and a first client device 22, where the live streamer client device 21 is equipped with an effect display apparatus, which is written in languages such as C/C++, Java, Shell or Python; the live streamer client device 21 and the first client device 22 can be, for example, a mobile phone, a desktop computer, a tablet computer, etc. The live streamer client device 21 is in communication with the first client device 22, enabling information interaction between the two.

Based on the above system architecture, an executive entity of the present embodiment may specifically be an effect display apparatus, and the effect display apparatus may be coupled into the first client device 22. In response to the detection of the effect trigger operation, the effect display apparatus can determine the first time information corresponding to the effect trigger operation. The first time information may specifically be the time when the user watching the live stream room triggers a virtual object-gifting operation, or the time when the live streamer user of the live stream room triggers the effect information.

The streaming media content includes a plurality of image frames during the live stream in the live stream room as well as a timestamp corresponding to each image frame. Therefore, according to the first time information, the first image frame corresponding to the first time information in the streaming media content can be determined.

The first effect information corresponding to the effect trigger operation is determined. Specifically, the effect trigger operation may further include the effect identification information. Therefore, according to the effect identification information, the first effect information corresponding to the effect identification information can be acquired in a preset data server.

Further, on the basis of Embodiment 1, Step 101 specifically includes:

in response to detection of the effect trigger operation, generating the effect trigger instruction.

In the present embodiment, the effect display apparatus can acquire the effect trigger operation of the user, and the effect trigger operation may specifically be a virtual object-gifting operation of a user watching the live stream room, or an effect selection operation of the live streamer user corresponding to the live stream room. According to the effect trigger operation, the effect trigger instruction is generated.

Further, on the basis of Embodiment 1, after Step 102, it further includes:

displaying an effect corresponding to the target effect information.

In the present embodiment, the effect display apparatus coupled to the first client device can directly control a preset display interface after the target effect information is generated, to display the target effect information. In an embodiment, the first client device may also send the target effect information to all other first client devices associated with the live stream room, so that other first client devices may display the target effect information.

In the effect display method provided in the present embodiment, the target effect information is generated according to the first effect information and the first image frame in the streaming media content of the live stream room corresponding to the effect trigger instruction by the effect display apparatus coupled to the first client device; the target effect information is sent to the first client device associated with the live stream room, so that the first client device displays the effect corresponding to the target effect information. In this way, it is not necessary to perform an effect fusion operation on the live streamer's terminal device, and the generation of the target effect information can be achieved in the first client only according to the effect trigger instruction, improving the efficiency of the target effect information generation and avoiding the problem of effect being blocked after data fusion on the live streamer client device.

Further, on the basis of any one of the above embodiments, Step 101 specifically includes:

acquiring the effect trigger instruction from the first client device; where, the effect trigger instruction indicates the first image frame, and the effect trigger instruction further indicates the first effect information.

Figure 3:
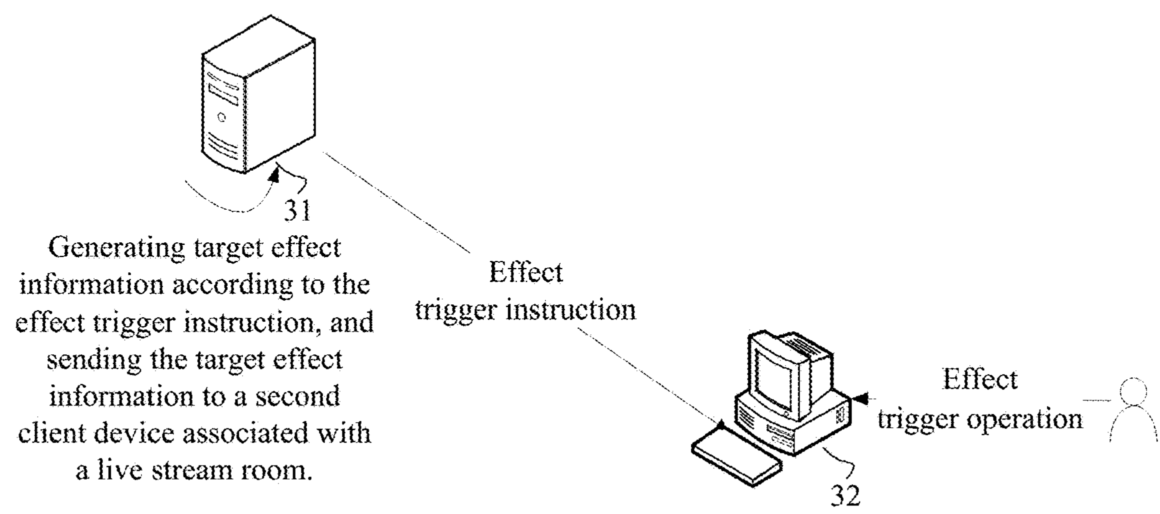
FIG. 3 is another system architecture diagram on which an embodiment of the present disclosure is based.

FIG. 3 is another system architecture diagram on which an embodiment of the present disclosure is based. As shown in FIG. 3, the system architecture includes at least a server 31 and a first client device 32, where the server 31 is equipped with an effect display apparatus, which is written in languages such as C/C++, Java, Shell or Python; the first client device 32 can be, for example, a mobile phone, a desktop computer, a tablet computer, etc. The server 31 is in communication with the first client device 32, enabling information interaction between the two.

According to the above system architecture, the executive entity of the present embodiment is an effect display apparatus, and the effect display apparatus may be coupled into the server. The effect display apparatus may acquire an effect trigger instruction from the first client device, where the effect trigger instruction indicates the first image frame and the first effect information. Where the effect trigger instruction is generated by the first client device after detecting the effect trigger operation preset by the live streamer user or the watcher user. The effect trigger operation may specifically be a virtual object-gifting operation of a user watching the live stream room, or an effect selection operation of the live streamer user corresponding to the live stream room.

Further, on the basis of any one of the above embodiments, the effect trigger instruction indicating the first image frame includes:

the effect trigger instruction indicates the first time information, and the first image frame includes the first image frame corresponding to the first time information in the streaming media content of the live stream room.

In the present embodiment, the effect trigger instruction indicates the first time information, which may specifically be the time when the user watching the live stream room triggers the virtual object-gifting operation, or the time when the live streamer user of the live stream room triggers the effect information.

The streaming media content includes a plurality of image frames during the live stream in the live stream room as well as a timestamp corresponding to each image frame. Therefore, according to the first time information, the first image frame corresponding to the first time information in the streaming media content can be determined.

Further, on the basis of any one of the above embodiments, after Step 102, it further includes:

sending the target effect information to a second client device associated with the live stream room, so that the second client device displays an effect corresponding to the target effect information.

In the present embodiment, after generating the target effect information, the target effect information may be sent to all second client devices associated with the live stream room, so that the second client devices can display the effect corresponding to the target effect information after acquiring the target effect information.

In the effect display method provided in the present embodiment, the target effect information is generated according to the first effect information and the first image frame in the streaming media content of the live stream room corresponding to the effect trigger instruction by the effect display apparatus coupled into the server; and the target effect information is sent to the second client device associated with the live stream room, so that the second client device displays the effect corresponding to the target effect information. In this way, it is not necessary to perform an effect fusion operation on the live streamer's terminal device, and the generation of the target effect information can be achieved within the second client only according to the effect trigger instruction, improving the efficiency of generation of the target effect information and avoiding the problem of the effect being blocked after data fusion on the live streamer's client device.

Figure 4:
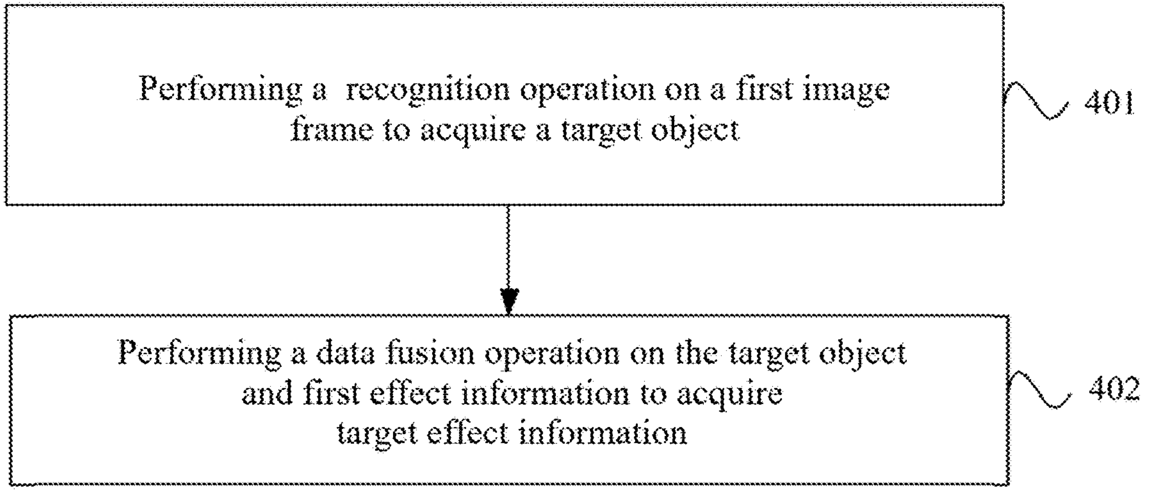
FIG. 4 is a schematic flowchart of an effect display method according to Embodiment 2 of the present disclosure.

FIG. 4 is a schematic flowchart of an effect display method according to Embodiment 2 of the present disclosure. On the basis of Embodiment 1, as shown in FIG. 4, Step 102 specifically includes:

Step 401: performing a recognition operation on the first image frame to acquire the target object.

Step 402: performing a data fusion operation on the target object and the first effect information to acquire the target effect information.

In an embodiment, after acquiring the effect trigger instruction, a fusion operation can be performed according to the first effect information and the first image frame indicated by the effect trigger instruction to acquire the target effect information.

Specifically, a recognition operation may be performed on the live streamer's avatar in the first image frame to acquire a target object, and the target object may specifically be a local area (e.g., head area) of the live streamer. A data fusion operation is performed on the target object and the first effect information to acquire the target effect information.

In an embodiment, the effect trigger instruction may also indicate an effect fused position. Therefore, according to the effect fused position, the first effect information can be fused to the effect fused position in the first image frame to acquire the target effect information.

In the effect display method provided in the present embodiment, the target object is acquired through an image recognition operation on the first image frame, and the target effect information is acquired through a data fusion operation on the target object and the first effect information. In this way, the fusion degree between the first effect information and the first image frame can be improved, and the display effect of the target effect information can be improved.

Figure 5:
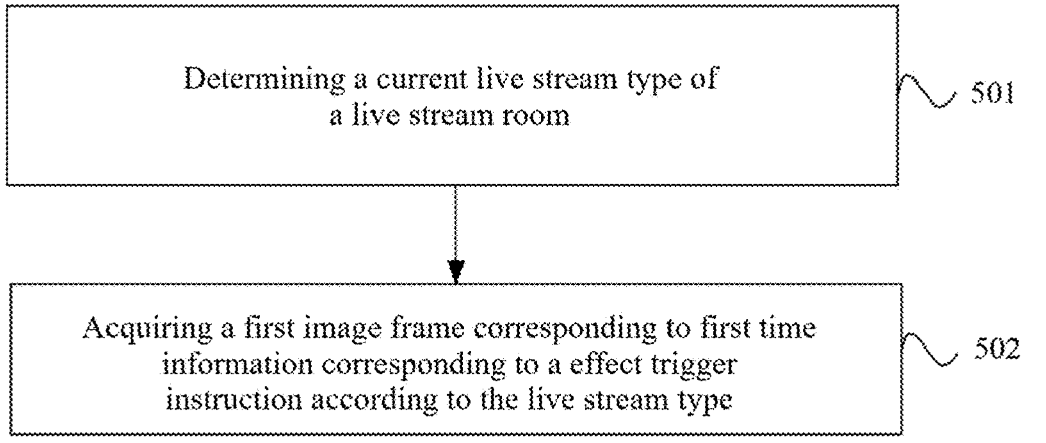
FIG. 5 is a schematic flowchart of an effect display method provided in Embodiment 3 of the present disclosure.

FIG. 5 is a schematic flowchart of an effect display method provided in Embodiment 3 of the present disclosure. On the basis of Embodiment 1, as shown in FIG. 5, Step 102 specifically includes:

Step 501: determining a current live stream type of the live stream room.

Step 502: acquiring the first image frame corresponding to the first time information corresponding to the effect trigger instruction according to the live stream type.

In the present embodiment, the live stream type in the live stream room may specifically include a single-person live stream type and a competition live stream type, and live streamer windows displayed on display interfaces of the two live stream types are different. In order to process the target effect information accurately, before acquiring the first image frame, it is necessary to determine the current live stream type of the live stream room firstly. According to the live stream type, the first image frame is acquired in the manner corresponding to the live stream type.

Further, on the basis of Embodiment 1, Step 502 specifically includes:

determining an image frame corresponding to the first time information as the first image frame, when the live stream type is a single-person live stream of the target live streamer user corresponding to the live stream room.

In the present embodiment, when the live stream type is the single-person live stream type of the target live streamer user, only a live stream window of the target live streamer user is displayed on the current display interface. Therefore, an image frame corresponding to the first time information in a video stream can be directly determined as the first image frame.

Figure 6:
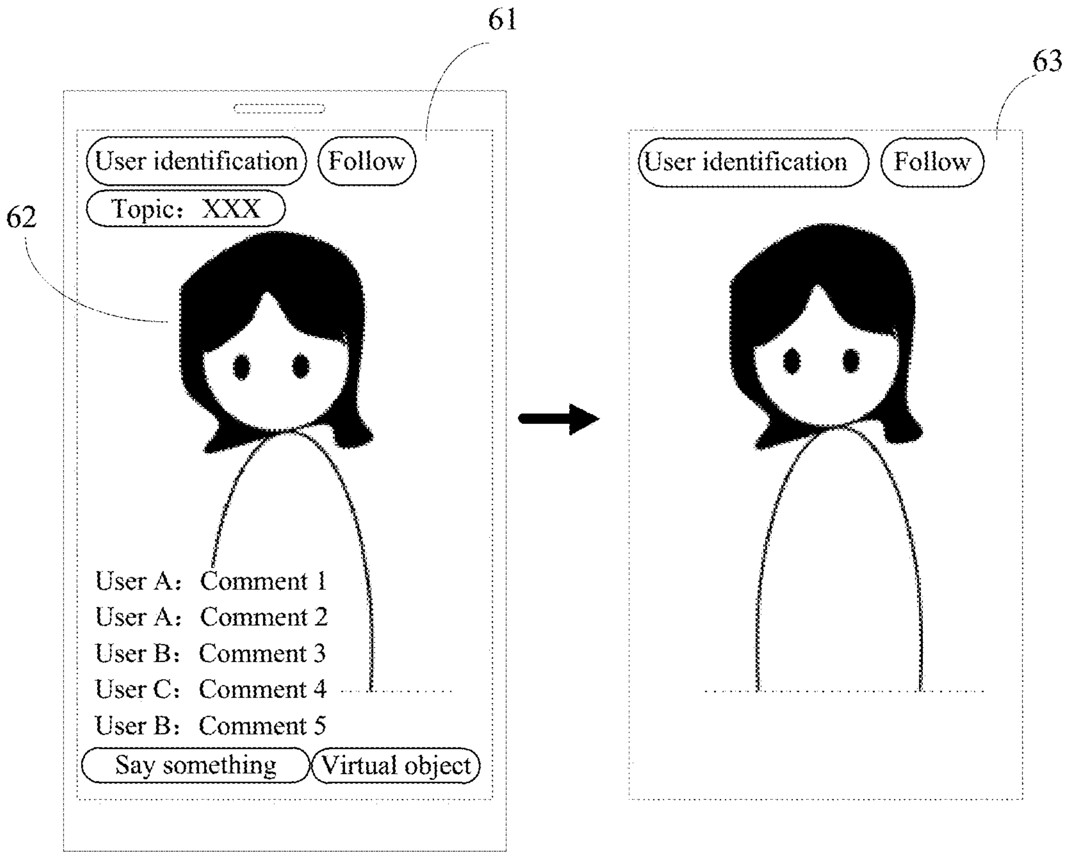
FIG. 6 is a schematic diagram of a display interface provided by an embodiment of the present disclosure.

FIG. 6 is a schematic diagram of a display interface provided by an embodiment of the present disclosure. As shown in FIG. 6, a current display interface 61 only includes a live stream window 62 corresponding to a target live streamer user. Therefore, an image frame corresponding to the first time information in a video stream can be directly determined as a first image frame 63.

Further, on the basis of Embodiment 1, Step 502 specifically includes:

determining an identification of a target live streamer user when the live stream type is a live stream type in which the target live streamer user corresponding to a live stream room competes with other live streamer user;

according to the identification of the target live streamer user, performing a screenshot operation on an image frame corresponding to the first time information to acquire a first image frame corresponding to the identification of the live streamer user;

where when the target live streamer user conducts a live stream competition with other live streamer user, the image frame displays both the live stream window of the target live streamer user and the live stream window of other live streamer user.

In the present embodiment, when the live stream type is a live stream type in which the target live streamer user competes with other live streamer user, the live stream windows of the target live streamer user and other live streamer user are simultaneously displayed on a display interface on a live stream-watching user side. Therefore, in order to accurately generate the target effect information, the screenshot operation can be performed on the image frame corresponding to the first time information according to the identification of the target live streamer user, to acquire the first image frame.

Figure 7:
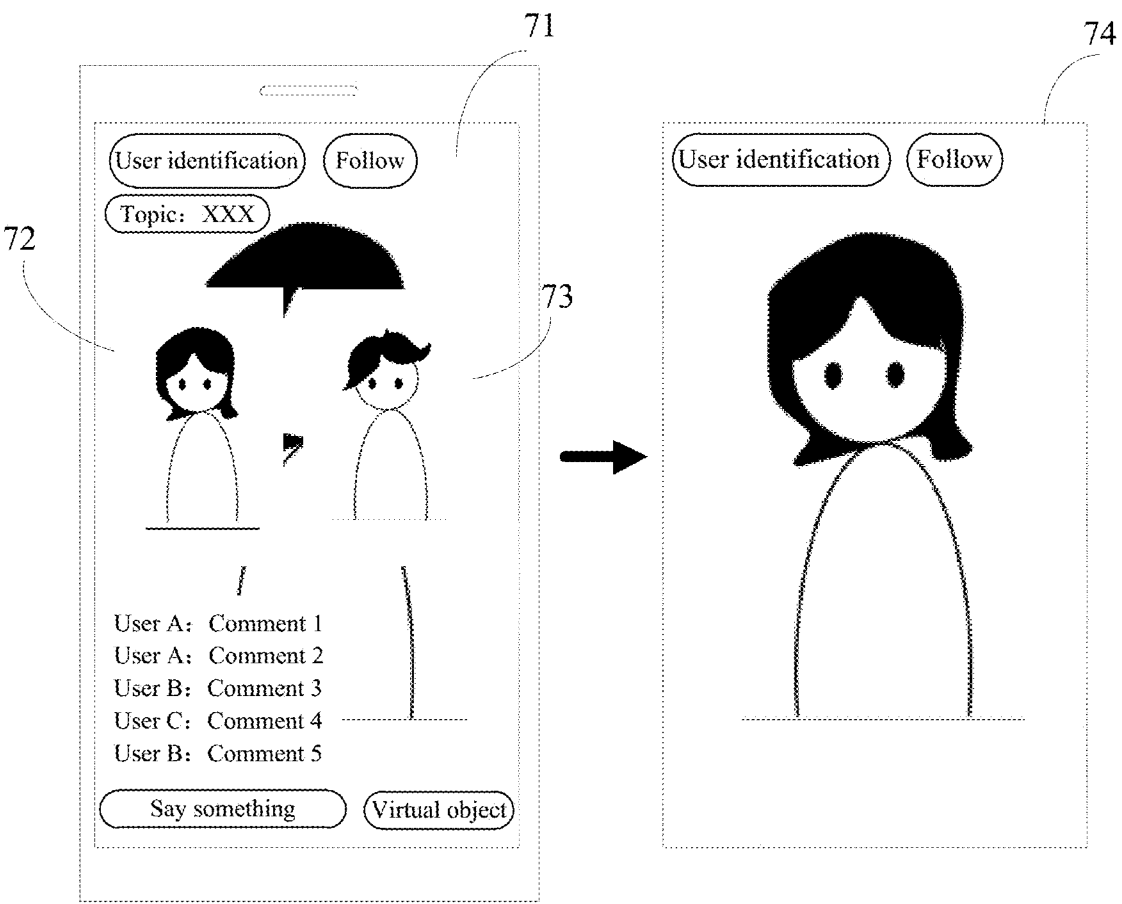
FIG. 7 is a schematic diagram of another display interface provided by an embodiment of the present disclosure.

FIG. 7 is a schematic diagram of another display interface provided by an embodiment of the present disclosure. As shown in FIG. 7, a live stream window 72 of the target live streamer user and a live stream window 73 of other live streamer user are displayed on a current display interface 71 simultaneously. At this time, the screenshot operation can be performed on the image frame corresponding to the first time information according to the identification of the target live streamer user to acquire a first image frame 74.

Further, on the basis of Embodiment 1, after sending data to be displayed to the live stream-watching user side for display, the method further includes:

controlling a client device to display the target effect information in full screen on an upper layer of the live stream windows of the target live streamer user and the other live streamer user.

In the present embodiment, in order to avoid the problem that the target effect information is only displayed in the live stream window of the target live streamer user in the competition live stream type, resulting in poor effect display effect, after acquiring the target effect information, the live stream-watching user side can be controlled to display the target effect information in full screen on an upper layer of the live stream windows of the target live streamer user and the other live streamer user.

In the effect display method provided in the present embodiment, the first image frame corresponding to the first time information corresponding to the effect trigger instruction is acquired according to the live stream type, and the live stream-watching user side is controlled to display the target effect information in full screen on an upper layer of live stream windows of the target live streamer user and the other live streamer user, thereby effectively avoiding the problem of poor effect display effect due to that the fused effect is only displayed in the live stream window of the target live streamer user in the competition live stream type, and thereby improving the display effect of the effect.

Figure 8:
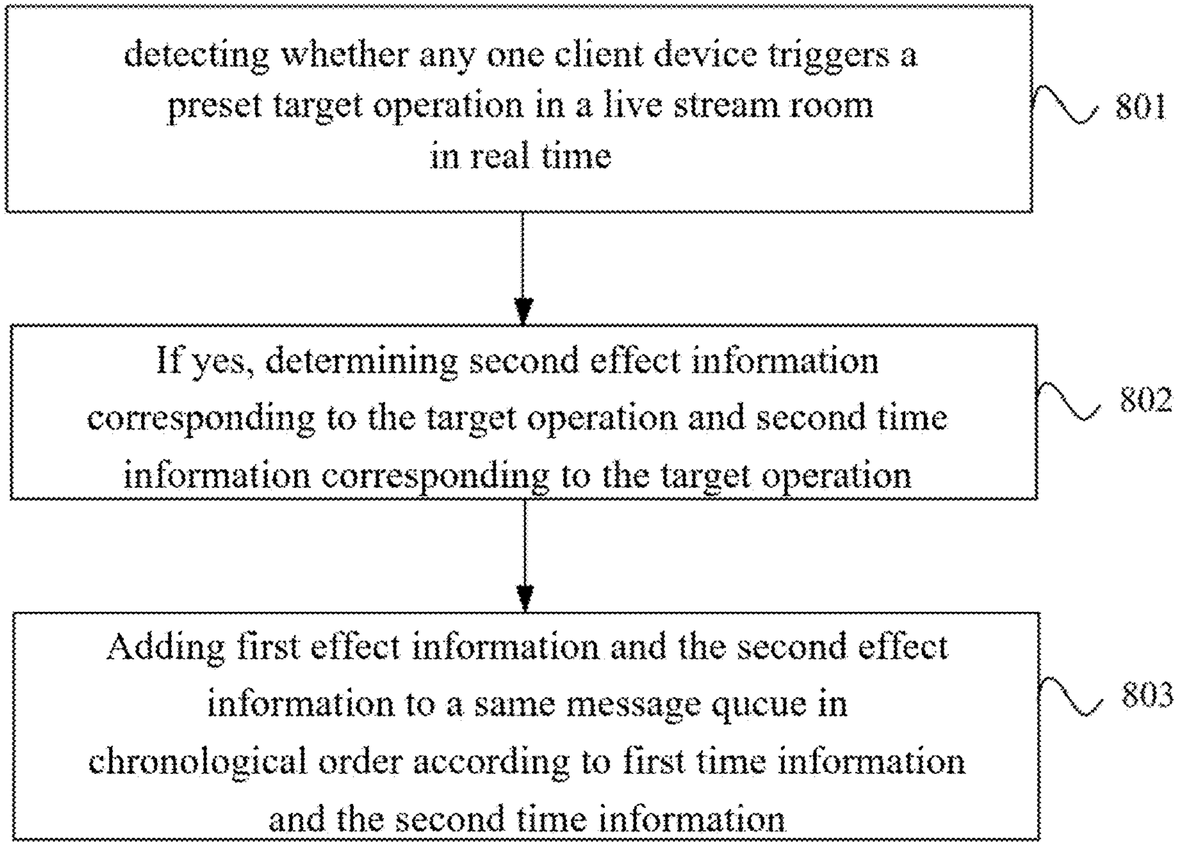
FIG. 8 is a schematic flowchart of an effect display method provided in Embodiment 4 of the present disclosure.

FIG. 8 is a schematic flowchart of an effect display method provided in Embodiment 4 of the present disclosure. On the basis of any one of the above embodiments, as shown in FIG. 8, after Step 101, the method further includes:

Step 801: detecting whether any one of the client devices triggers a preset target operation in the live stream room in real time.

Step 802: if yes, determining the second effect information corresponding to the target operation and the second time information corresponding to the target operation.

Step 803: adding the first and second effect information to a same message queue in chronological order according to the first time information and the second time information.

In the present embodiment, in the related effect display method, when playing a video stream including the fused effect and sent by the target live streamer user side, the live stream-watching user side may trigger the preset target operation at the same time. In this case, if the effect corresponding to the target effect information and the effect corresponding to the target operation are displayed simultaneously, the target effect information will be blocked and the display effect is poor. Where, the preset target operation specifically may be generated after the watching user side sends a specific virtual object in the live stream room.

Therefore, after determining the first time information indicated by the effect trigger instruction and sending the target effect information to the first client device, whether any one of the client devices triggers a preset target operation in the live stream room is detected in real time. If yes, the second effect information corresponding to the target operation and the second time information corresponding to the target operation are determined. The first and second effect information are added to the same message queue in chronological order according to the first time information and the second time information.

Further, on the basis of any one of the above embodiments, after Step 803, the method further includes:

sequentially acquiring the first or second effect information in the message queue in chronological order, and determining the target effect information according to the first or second effect information, as well as the target object in the first or second image frame corresponding to the first or second time information.

In the present embodiment, since the first effect information and the second effect information are currently in the same message queue, they will not be played simultaneously. At this time, the first effect information or the second effect information in the message queue is sequentially acquired in chronological order, and the target effect information is determined according to the first or second effect information, as well as the target object in the first or second image frame corresponding to the first or second time information.

In the effect display method provided in the present embodiment, the first and second effect information are added to the same message queue, so that they are not played simultaneously, avoiding the technical problem that the effect corresponding to the first effect information is blocked by the effect corresponding to the second effect information, and improving the display effect of the target effect information.

Figure 9:
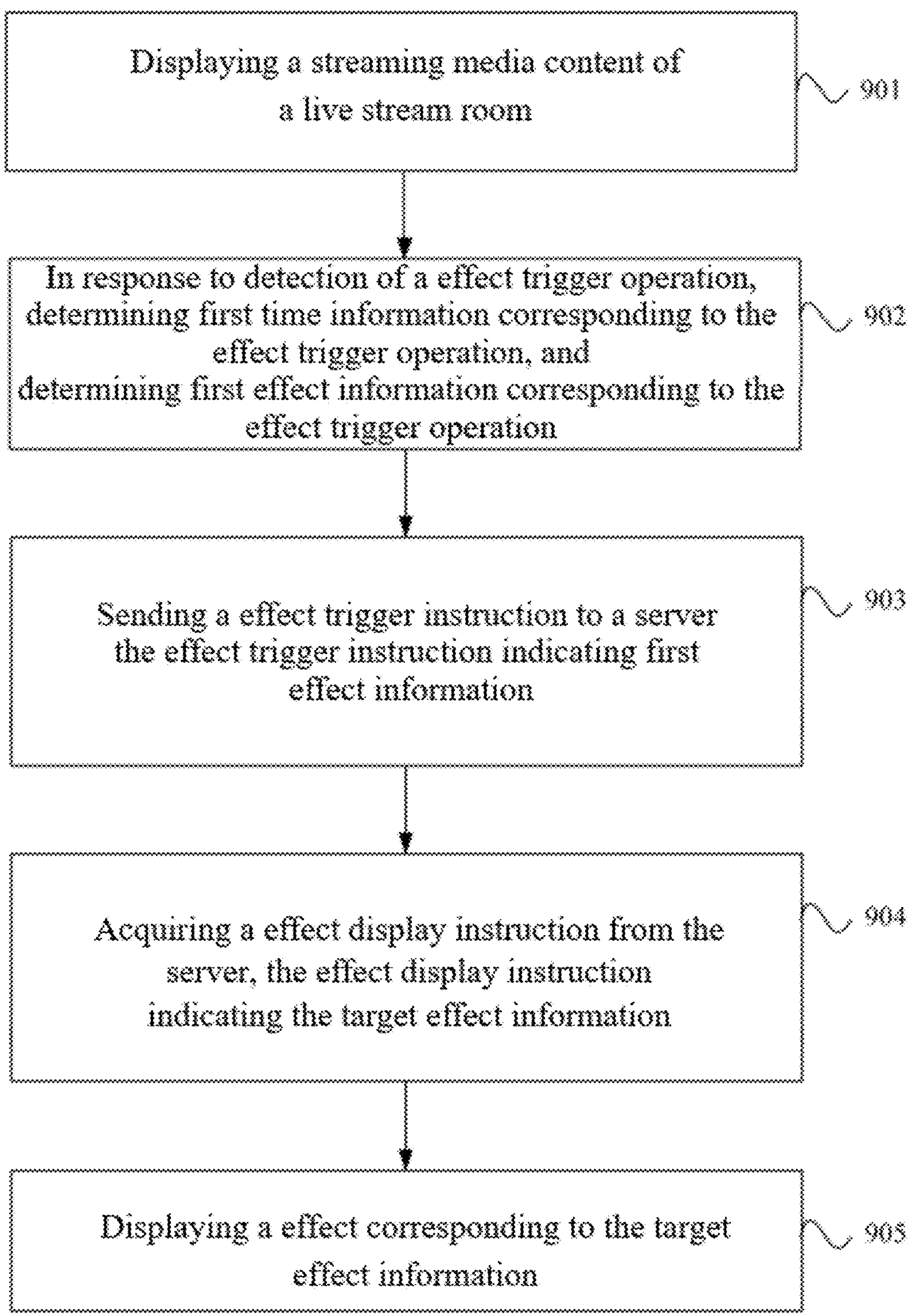
FIG. 9 is a schematic flowchart of an effect display method according to Embodiment 5 of the present disclosure.

FIG. 9 is a schematic flowchart of an effect display method according to Embodiment 5 of the present disclosure. As shown in FIG. 9, the method includes:

Step 901: displaying a streaming media content of a live stream room.

Step 902: in response to detection of an effect trigger operation, determining first time information corresponding to an effect trigger operation, and determining first effect information corresponding to the effect trigger operation.

Step 903: sending an effect trigger instruction to a server, the effect trigger instruction indicating the first effect information, and the effect trigger instruction also indicating a first image frame corresponding to the first time information in the streaming media content of the live stream room.

Step 904: acquiring an effect display instruction from the server, the effect display instruction indicating target effect information, and the target effect information being associated with the first effect information and a target object in the first image frame.

Step 905: displaying an effect corresponding to the target effect information.

An executive entity of the present embodiment is an effect display apparatus, which can be coupled to a first client device. Correspondingly, a server can be used to process the target effect information.

In the present embodiment, the first client device may display the streaming media content of the live stream room. When an effect trigger operation triggered by the live streamer user or watcher user is detected, the first time information corresponding to the effect trigger operation is determined, and the first effect information corresponding to the effect trigger operation is determined. An effect trigger instruction is generated according to the effect trigger operation, and the effect trigger instruction is sent to the server, where the effect trigger instruction indicates the first effect information, and the effect trigger instruction further indicates the first image frame corresponding to the first time information in the streaming media content of the live stream room. After acquiring the effect trigger instruction, the server may perform a fusion operation on the first image frame and the first effect information according to the effect trigger instruction, to acquire the target effect information and feed back the target effect information. The first client device can acquire the effect display instruction sent by the server, the effect display instruction indicates target effect information, and the target effect information is associated with the first effect information and the target object in the first image frame. The first client device can display the effect corresponding to the target effect information.

In the effect display method provided in the present embodiment, the effect trigger instruction is generated according to the effect trigger operation, the effect trigger instruction is sent to the server, the server generates the target effect information according to the first effect information and first image frame in the streaming media content of the live stream room corresponding to the effect trigger instruction, the target effect information is sent to the first client device associated with the live stream room, and the first client device displays the effect corresponding to the target effect information. In this way, it is not necessary to perform an effect fusion operation on the live streamer's terminal device, and only needs to determine the first image frame and the first effect information, and then the synthesis of the target effect information and the display of the effect corresponding to the target effect information can be realized on the client device or server, and also the data in the live stream room will not block the effect corresponding to the target effect information.

Figure 10:
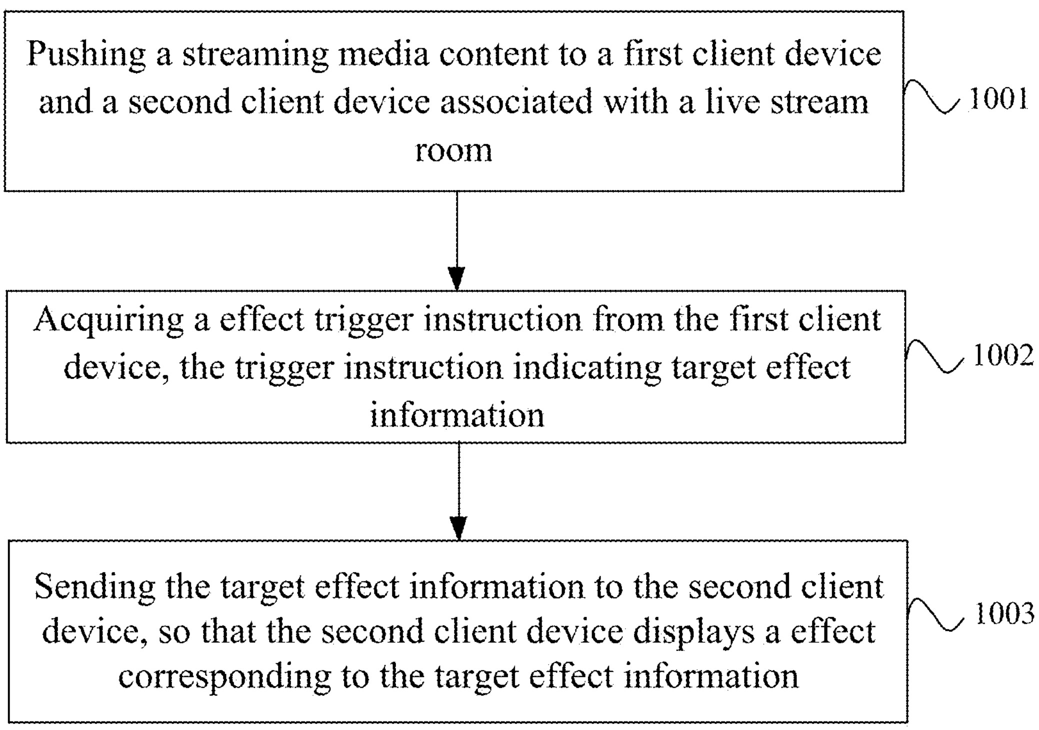
FIG. 10 is a schematic flowchart of an effect display method provided by Embodiment 6 of the present disclosure.

FIG. 10 is a schematic flowchart of an effect display method provided by Embodiment 6 of the present disclosure. As shown in FIG. 10, the method includes:

Step 1001: pushing a streaming media content to a first client device and a second client device associated with a live stream room.

Step 1002: acquiring an effect trigger instruction from the first client device, where the effect trigger instruction indicates target effect information, the target effect information is associated with first effect information and a target object in a first image frame in the streaming media content, the first effect information includes effect information corresponding to an effect trigger operation detected by the first client device, the effect trigger operation corresponds to first time information, and the first image frame includes an image frame corresponding to the first time information in the streaming media content of the live stream room.

Step 1003: sending the target effect information to the second client device, so that the second client device displays the effect corresponding to the target effect information.

An executive entity of the present embodiment is an effect display apparatus, which can be coupled to a server. The target effect information can specifically be generated in the server.

In the present embodiment, the server can push the streaming media content to the first client device and the second client device associated with the live stream room. The effect trigger instruction is acquired from the first client device, and the effect trigger instruction indicates the target effect information, the target effect information is associated with the first effect information and the target object in the first image frame of the streaming media content, and the first effect information includes the effect information corresponding to the effect trigger operation detected by the first client device, and the effect trigger operation corresponds to the first time information, and the first image frame includes the image frame corresponding to the first time information in the streaming media content of the live stream room. The target effect information can specifically be generated within the first client device and is fed back from the first client device to the server. The server can send the target effect information to the second client device so as to cause the second client device to display the effect corresponding to the target effect information.

In the effect display method provided by the present embodiment, the target effect information is generated on the first client device, and the generated target effect information is sent to the second client device associated with the live stream room to display. In this way, it is not necessary to perform a fusion operation of the effect at the live streamer's terminal device, and only needs to determine the first image frame and the first effect information, and then the synthesis of the target effect information and the display of the effect corresponding to the target effect information can be realized on the client device or server, and also the data in the live stream room will not block the effect corresponding to the target effect information.

Figure 11:
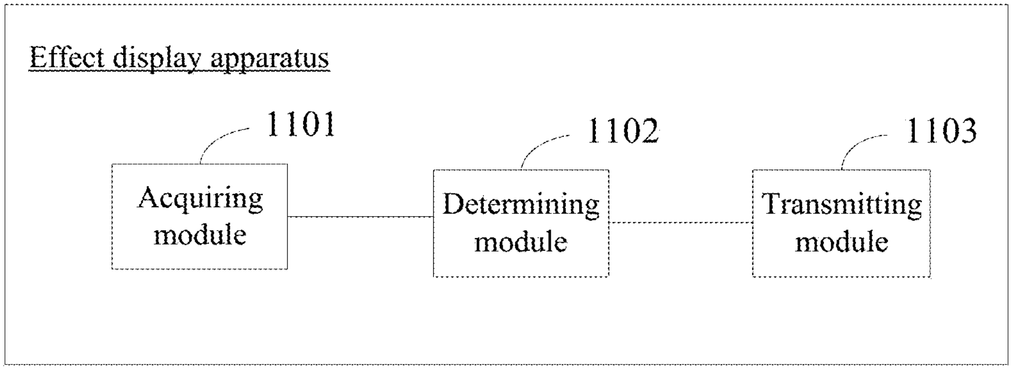
FIG. 11 is a schematic structural diagram of an effect display apparatus provided by Embodiment 7 of the present disclosure.

FIG. 11 is a schematic structural diagram of an effect display apparatus provided by Embodiment 7 of the present disclosure. As shown in FIG. 11, the apparatus includes: an acquiring module 1101, a determining module 1102, and a transmitting module 1103, where the acquiring module 1101 is configured to acquire an effect trigger instruction, the effect trigger instruction corresponding to a first image frame in streaming media content of a live stream room, and the effect trigger instruction also corresponding to first effect information; the determining module 1102 is configured to determine, in response to the effect trigger instruction, target effect information according to the first effect information and a target object in the first image frame; and the transmitting module 1103 is configured to send the target effect information to a first client device associated with the live stream room, so that the first client device displays an effect corresponding to the target effect information.

Further, on the basis of Embodiment 7, the apparatus further includes: a processing module, which is configured to determine, in response to detection of the effect trigger operation, the first time information corresponding to the effect trigger operation; determine the first image frame corresponding to the first time information in the streaming media content of the live stream room; and determine the first effect information corresponding to the effect trigger operation.

Further, on the basis of Embodiment 7, the acquiring module is configured to generate, in response to detection of the effect trigger operation, the effect trigger instruction.

Further, on the basis of Embodiment 7, the apparatus further includes: a displaying module, which is configured to display the effect corresponding to the target effect information.

Further, on the basis of any one of the above-mentioned embodiments, the acquiring module is configured to acquire the effect trigger instruction from the first client device, where the effect trigger instruction indicates the first image frame, and the effect trigger instruction further indicates the first effect information.

Further, on the basis of any one of the above-mentioned embodiments, the effect trigger instruction indicating the first image frame includes: the effect trigger instruction indicates the first time information, and the first image frame includes the first image frame corresponding to the first time information in the streaming media content of the live stream room.

Further, on the basis of any one of the above-mentioned embodiments, the apparatus further includes: an effect sending module, which is configured to send the target effect information to the second client device associated with the live stream room, so that the second client device displays the effect corresponding to the target effect information.

Further, on the basis of any one of the above-mentioned embodiments, the apparatus further includes: a type determining module, configured to determine a current live stream type of the live stream room; and an image processing module, configured to acquire the first image frame corresponding to the first time information corresponding to the effect trigger instruction according to the live stream type.

Further, on the basis of any one of the above-mentioned embodiments, the image processing module is configured to: determine an identification of a target live streamer user when the live stream type is a live stream type in which the target live streamer user corresponding to the live stream room competes with other live streamer user; and according to the identification of the target live streamer user, perform a screenshot operation on the image frame corresponding to the first time information so as to acquire a first image frame corresponding to the identification of the live streamer user. Where when the target live streamer user conducts a live stream competition with other live streamer user, the image frame simultaneously displays live stream windows of the target live streamer user and other live streamer user.

Further, on the basis of any one of the above-mentioned embodiments, the image processing module is configured to determine the image frame corresponding to the first time information as the first image frame, when the live stream type is a single-person live stream of the target live streamer user corresponding to the live stream room.

Further, on the basis of any one of the above-mentioned embodiments, the apparatus further includes a controlling module, configured to control the client device to display the target effect information in full screen on an upper layer of live stream windows of the target live streamer user and the other live streamer user.

Further, on the basis of any one of the above-mentioned embodiments, the determining module is configured to perform a recognition operation on the first image frame to acquire the target object; and perform a data fusion operation on the target object and the first effect information to acquire the target effect information.

Further, on the basis of any one of the above-mentioned embodiments, the apparatus further includes: a detecting module, configured to detect whether any one of the client devices triggers a preset target operation in the live stream room in real time; a time information determining module, configured to determine the second effect information corresponding to the target operation and the second time information corresponding to the target operation, if any one of the client devices triggers the preset target operation in the live stream room; and a sorting module, configured to add the first effect information and the second effect information to a same message queue in chronological order according to the first time information and the second time information.

Further, on the basis of any one of the above embodiments, the apparatus further includes an effect acquiring module, configured to sequentially acquire the first or second effect information in the message queue in chronological order, and determine the target effect information according to the first or second effect information, as well as the target object in the first image frame corresponding to the first time information or in the second image frame corresponding to the second time information.

Figure 12:
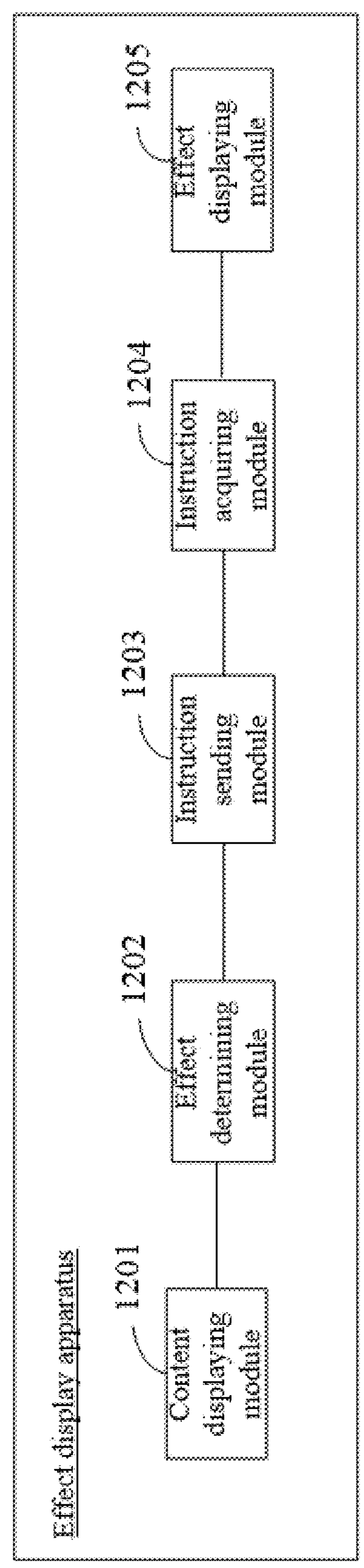
FIG. 12 is a schematic structural diagram of an effect display apparatus provided by Embodiment 8 of the present disclosure.

FIG. 12 is a schematic structural diagram of an effect display apparatus provided by Embodiment 8 of the present disclosure. As shown in FIG. 12, the apparatus includes: a content displaying module 1201, an effect determining module 1202, an instruction sending module 1203, an instruction acquiring module 1204, and an effect displaying module 1205. Where the content displaying module 1201 is configured to display a streaming media content of a live stream room; the effect determining module 1202 is configured determine, in response to detection of an effect trigger operation, first time information corresponding to the effect trigger operation, and determine first effect information corresponding to the effect trigger operation; the instruction sending module 1203 is configured to send an effect trigger instruction to a server, the effect trigger instruction indicating the first effect information, and the effect trigger instruction also indicating a first image frame corresponding to the first time information in the streaming media content of the live stream room; the instruction acquiring module 1204 is configured to acquire an effect display instruction from the server, the effect display instruction indicating target effect information, and the target effect information being associated with the first effect information and the target object in the first image frame; and the effect displaying module 1205 is configured to display an effect corresponding to the target effect information.

Figure 13:
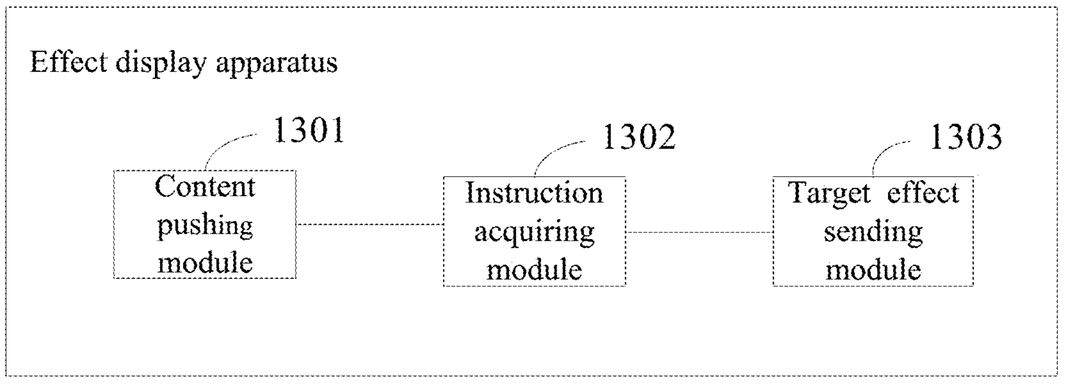
FIG. 13 is a schematic structural diagram of an effect display apparatus provided by Embodiment 9 of the present disclosure.

FIG. 13 is a schematic structural diagram of an effect display apparatus provided by Embodiment 9 of the present disclosure. As shown in FIG. 13, the apparatus includes: a content pushing module 1301, an instruction acquiring module 1302 and a target effect sending module 1303. Where the content pushing module 1301 is configured to push a streaming media content to a first client device and a second client device associated with a live stream room; the instruction acquiring module 1302 is configured to acquire an effect trigger instruction from the first client device, where the effect trigger instruction indicates target effect information, and the target effect information is associated with first effect information and a target object in a first image frame of the streaming media content, the first effect information includes effect information corresponding to an effect trigger operation detected by the first client device, the effect trigger operation corresponds to first time information, and the first image frame includes an image frame corresponding to the first time information in the streaming media content of the live stream room; and the target effect sending module 1303 is configured to send the target effect information to the second client device, so that the second client device displays an effect corresponding to the target effect information.

The apparatus provided in the present embodiment can be used to implement the technical solutions of the above method embodiments, and the implementation principles and technical effects thereof are similar to the latter, and details are not described herein again in the present embodiment.

Figure 14:
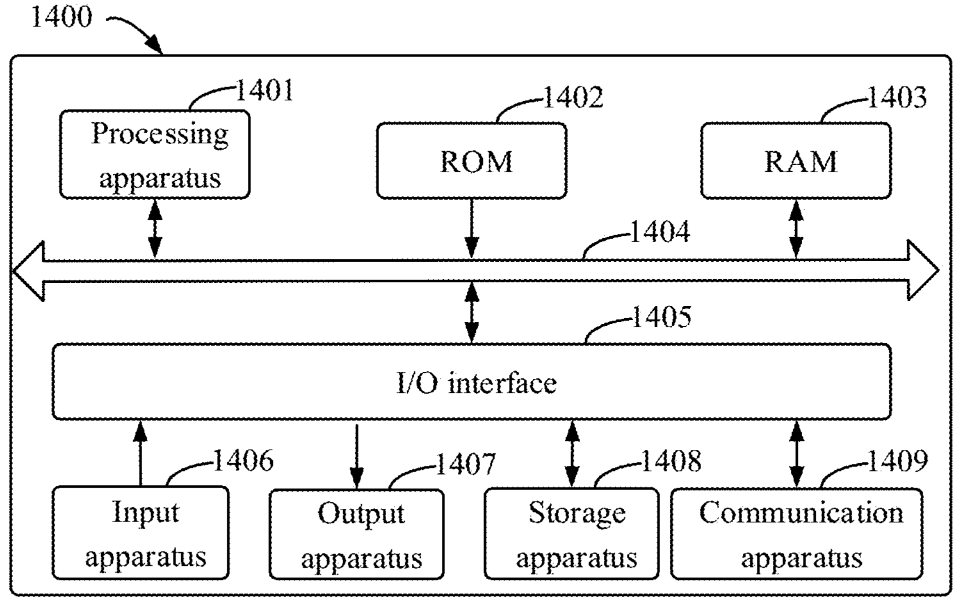
FIG. 14 is a schematic structural diagram of an effect display device provided by Embodiment 10 of the present disclosure.

FIG. 14 is a schematic structural diagram of an effect display device according to Embodiment 10 of the present disclosure, showing a schematic structural diagram of an electronic device 1400 suitable for implementing of the embodiment of the present disclosure. The electronic device 1400 may be a terminal device or a server. Where the terminal device may include, but is not limited to, mobile terminals, such as mobile phones, notebook computers, digital broadcast receivers, personal digital assistants (referred to as PDA), portable android device (referred to as PAD), portable media players (referred to as PMP), vehicle-in terminals (e.g., vehicle-in navigation terminals) and the like, and stationary terminals such as digital TVs (Television), desktop computers, and the like. The electronic device shown in FIG. 14 is only an example, and should not impose any limitation on the function and scope of use of the embodiments of the present disclosure.

As shown in FIG. 14, the electronic device 1400 may include a processing apparatus (such as a central processor, a graphics processor, etc.) 1401, which executes various appropriate actions and processes according to programs stored in a read only memory (referred to as ROM) 1402 or programs loaded from a storage apparatus 1408 into a random access memory (referred to as RAM) 1403. RAM 1403 also stores various programs and data required for the operation of the electronic device 1400. The processing apparatus 1401, ROM 1402 and RAM 1403 are connected to each other through a bus 1404. An input/output (referred to as I/O) interface 1405 is also connected to the bus 1404.

Generally, the following apparatuses can be connected to the I/O interface 1405: an input apparatus 1406, including such as touch screen, touchpad, keyboard, mouse, camera, microphone, accelerometer, gyroscope, etc.; an output apparatus 1407, including such as liquid crystal displays (referred to as LCDs), speakers, vibrators, etc.; a storage apparatus 1408, including such as magnetic tapes, hard drives, etc.; and a communication apparatus 1409. The communication apparatus 1409 may allow the electronic device 1400 to conduct wireless or wired communicate with other apparatus to exchange data. Although FIG. 14 illustrates the electronic device 1400 with various apparatuses, it should be understood that it is not required to implement or have all apparatuses shown. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product including a computer program carried on a computer-readable medium, the computer program containing program codes for performing the methods illustrated in the flowcharts. In such an embodiment, the computer program may be downloaded and installed from the network via the communication apparatus 1409, or installed from the storage apparatus 1408, or installed from the ROM 1402. When the computer program is executed by the processing apparatus 1401, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer readable storage medium can be, for example, but not limited to, an electrical, magnetic, optical, electromagnetic, infrared or semiconductor system, apparatus or device, or any combination of the above. More specific examples of the computer readable storage media may include, but are not limited to, electrical connection with one or more wires, portable computer disk, hard disk, random access memory (RAM), read only memory (ROM), erasable programmable read-only memory (referred to as EPROM or flash memory), optical fiber, portable compact disk read-only memory (referred to as CD-ROM), optical storage device, magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal medium may include data signals propagable in a baseband or as part of a carrier wave, and the data signals carry computer-readable program codes. Such propagable data signals can take various forms, including but not limited to electromagnetic signals, optical signals, or any suitable combination of the above. The computer-readable signal medium can also be any computer-readable medium other than the computer-readable storage medium, and can send, propagate, or transmit programs for use by or in combination with an instruction execution system, apparatus, or device. The program codes contained on the computer-readable medium can be transmitted by any suitable medium, including but not limited to: electric wire, optical cable, RF (Radio Frequency), etc., or any suitable combination of the above.

The above-mentioned computer-readable medium may be included in the above-mentioned electronic device; or may exist separately without being assembled into the electronic device.

The above-mentioned computer-readable medium carries one or more programs that, when executed by the electronic device, cause the electronic device to execute the methods shown in the above-mentioned embodiments.

Another embodiment of the present disclosure further provides a computer-readable storage medium, the computer-readable storage medium stores computer-executable instructions that, when executed by a computing device, cause the computing device to implement the effect display method as described in any one of the above-mentioned embodiments.

Another embodiment of the present disclosure further provides a computer program product, which is characterized by including a computer program that, when executed by a processor, implements the effect display method as described in any one of the above-mentioned embodiments.

Computer program codes for executing the operations of the present disclosure may be written in one or more programming languages or a combination thereof, including object-oriented programming languages such as Java, Smalltalk, C++, and conventional procedural programming languages such as "C" language or similar programming languages. The program codes may be completely executed on a user's computer, partially executed on the user's computer, executed as a standalone software package, partially executed on a user's computer and partially on a remote computer, or completely executed on a remote computer or server. In a case of involving a remote computer, the remote computer can be connected to a user's computer through any kind of network, including a local area network (referred to as LAN) or wide area network (referred to as WAN), or can connect to an external computer (such as using an Internet service provider to connect through the Internet).

The flowcharts and block diagrams in the accompanying drawings illustrate the architectures, functions, and operations that may be implemented by systems, methods, and computer program products according to various embodiments of the present disclosure. At this point, each block in the flowcharts or block diagrams may represent a module, program segment, or portion of code, the module, program segment, or portion of code contains one or more executable instructions for implementing a specified logical function. It should also be noted that in some alternative implementations, the functions indicated in the blocks can also occur in a different order than that indicated in the accompanying drawings. For example, two consecutive blocks shown can actually be executed in parallel, and sometimes they can also be executed in an opposite order, depending on the function involved. It should also be noted that each block in the block diagrams and/or flowcharts, and the combination of blocks in the block diagrams and/or flowcharts, can be implemented using a dedicated hardware-based system that perform specified functions or operations, or can be implemented using a combination of dedicated hardware and computer instructions.

The modules involved in the embodiments of the present disclosure may be implemented through software or hardware. Where names of the modules do not constitute a definition on the module itself in some cases.

The functions described herein can be at least partially executed by one or more hardware logic components. For example, non-restrictively, exemplary types of hardware logic components that may be used include: field-programmable gate array (referred to as FPGA), field-programmable gate array (referred to as FPGA), application specific standard product (referred to as ASSP), system-on-a-chip (referred to as SOC), complex programmable logic device (referred to as CPLD) and so on.

In the context of the present disclosure, the machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the above. More specific examples of the machine readable storage medium may include electrical connection based on one or more wires, portable computer disk, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

In a first aspect, one or more embodiments of the present disclosure provide an effect display method, including:

- acquiring an effect trigger instruction, the effect trigger instruction corresponding to a first image frame in a streaming media content of a live stream room, and the effect trigger instruction also corresponding to first effect information;
- in response to the effect trigger instruction, determining target effect information according to the first effect information and a target object in the first image frame; and
- sending the target effect information to a first client device associated with the live stream room, so that the first client device displays an effect corresponding to the target effect information.

According to one or more embodiments of the present disclosure, before acquiring the effect trigger instruction, the method further includes:

- in response to detection of an effect trigger operation, determining first time information corresponding to the effect trigger operation; determining the first image frame corresponding to the first time information in the streaming media content of the live stream room; and determining the first effect information corresponding to the effect trigger operation.

According to one or more embodiments of the present disclosure, acquiring the effect trigger instruction includes: in response to the detection of the effect trigger operation, generating the effect trigger instruction.

According to one or more embodiments of the present disclosure, after determining the target effect information according to the first effect information and the target object in the first image frame in response to the effect trigger instruction, the method further includes:

- displaying an effect corresponding to the target effect information.

According to one or more embodiments of the present disclosure, acquiring the effect trigger instruction includes:

- acquiring the effect trigger instruction from the first client device, where the effect trigger instruction indicates the first image frame, and the effect trigger instruction further indicates the first effect information.

According to one or more embodiments of the present disclosure, the effect trigger instruction indicating the first image frame includes:

- the effect trigger instruction indicates the first time information, and the first image frame includes the first image frame corresponding to the first time information in the streaming media content of the live stream room.

According to one or more embodiments of the present disclosure, after determining the target effect information according to the first effect information and the target object in the first image frame in response to the effect trigger instruction, the method further includes:

- sending the target effect information to a second client device associated with the live stream room, so that the second client device displays the effect corresponding to the target effect information.

According to one or more embodiments of the present disclosure, the method further includes:

- determining a current live stream type of the live stream room; and
- acquiring the first image frame corresponding to the first time information corresponding to the effect trigger instruction according to the live stream type.

According to one or more embodiments of the present disclosure, acquiring the first image frame corresponding to the first time information corresponding to the effect trigger instruction according to the live stream type includes:

- determining an identification of a target live streamer user when the live stream type is a live stream type in which the target live streamer user corresponding to the live stream room competes with other live streamer user; and
- according to the identification of the target live streamer user, performing a screenshot operation on an image frame corresponding to the first time information to acquire the first image frame corresponding to the identification of the target live streamer user;
- where, when the target live streamer user conducts a live stream competition with the other live streamer user, the image frame simultaneously displays live stream windows of the target live streamer user and the other live streamer user.

According to one or more embodiments of the present disclosure, acquiring the first image frame corresponding to the first time information corresponding to the effect trigger instruction according to the live stream type includes:

- determining an image frame corresponding to the first time information as the first image frame, when the live stream type is a single-person live stream of the target live streamer user corresponding to the live stream room.

According to one or more embodiments of the present disclosure, after sending the target effect information to the first client device associated with the live stream room, the method further includes:

- controlling the client device to display the target effect information in full screen on an upper layer of live stream windows of the target live streamer user and the other live streamer user.

According to one or more embodiments of the present disclosure, determining the target effect information according to the first effect information and the target object in the first image frame in response to the effect trigger instruction, includes:

performing a recognition operation on the first image frame to acquire the target object; and performing a data fusion operation on the target object and the first effect information to acquire the target effect information.

According to one or more embodiments of the present disclosure, the method further includes:

detecting whether any one of client devices triggers a preset target operation in the live stream room in real time;

if yes, determining a second effect information corresponding to the target operation and second time information corresponding to the target operation; and adding the first and second effect information to a same message queue in chronological order according to the first time information and the second time information.

According to one or more embodiments of the present disclosure, after adding the first and second effect information to the same message queue in chronological order according to the first time information and the second time information, the method further includes:

sequentially acquiring the first or second effect information in the message queue in chronological order, and determining the target effect information according to the first or second effect information, and the target object in the first image frame corresponding to the first time information or in a second image frame corresponding to the second time information.

In a second aspect, one or more embodiments of the present disclosure provide an effect display method, including:

displaying a streaming media content of a live stream room;

in response to detection of an effect trigger operation, determining first time information corresponding to the effect trigger operation, and determining first effect information corresponding to the effect trigger operation;

sending an effect trigger instruction to a server, the effect trigger instruction indicating the first effect information, and the effect trigger instruction also indicating a first image frame corresponding to the first time information in the streaming media content of the live stream room;

acquiring an effect display instruction from the server, the effect display instruction indicating target effect information, and the target effect information being associated with the first effect information and a target object in the first image frame; and displaying an effect corresponding to the target effect information.

In a third aspect, one or more embodiments of the present disclosure provide an effect display method, including:

pushing a streaming media content to a first client device and a second client device associated with a live stream room;

acquiring an effect trigger instruction from the first client device, where the effect trigger instruction indicates target effect information, the target effect information is associated with first effect information and a target object in a first image frame in the streaming media content, the first effect information includes effect information corresponding to an effect trigger operation detected by the first client device, the effect trigger operation corresponds to first time information, and the first image frame includes an image frame corresponding to the first time information in the streaming media content of the live stream room; and sending the target effect information to the second client device, so that the second client device displays an effect corresponding to the target effect information.

In a forth aspect, one or more embodiments of the present disclosure provide an effect display apparatus, including:

an acquiring module, configured to acquire an effect trigger instruction, the effect trigger instruction corresponding to a first image frame in a streaming media content of a live stream room, and the effect trigger instruction also corresponding to first effect information;

a determining module, configured to determine, in response to the effect trigger instruction, target effect information according to the first effect information and a target object in the first image frame; and a sending module, configured to send the target effect information to a first client device associated with the live stream room, so that the first client device displays an effect corresponding to the target effect information.

According to one or more embodiments of the present disclosure, the device further includes:

a processing module, configured to determine, in response to detection of the effect trigger operation, first time information corresponding to the effect trigger operation; determine the first image frame corresponding to the first time information in the streaming media content of the live stream room; and determine the first effect information corresponding to the effect trigger operation.

According to one or more embodiments of the present disclosure, the acquiring module is configured to generate, in response to detection of the effect trigger operation, the effect trigger instruction.

According to one or more embodiments of the present disclosure, the device further includes:

a displaying module configured to display the effect corresponding to the target effect information.

According to one or more embodiments of the present disclosure, the acquiring module is configured to:

acquire the effect trigger instruction from the first client device, where the effect trigger instruction indicates the first image frame, and the effect trigger instruction further indicates the first effect information.

According to one or more embodiments of the present disclosure, the effect trigger instruction indicating the first image frame, includes:

the effect trigger instruction indicates the first time information, and the first image frame includes the first image frame corresponding to the first time information in the streaming media content of the live stream room.

According to one or more embodiments of the present disclosure, the device further includes: an effect sending module configured to send the target effect information to a second client device associated with the live stream room, so that the second client device displays the effect corresponding to the target effect information.

According to one or more embodiments of the present disclosure, the device further includes:

a type determining module configured to determine a current live stream type of the live stream room; and an image processing module configured to acquire the first image frame corresponding to the first time information corresponding to the effect trigger instruction according to the live stream type.

According to one or more embodiments of the present disclosure, the image processing module is configured to:

determine an identification of a target live streamer user when the live stream type is a live stream type in which the target live streamer user corresponding to the live stream room competes with other live streamer user;

according to the identification of the target live streamer user, performing a screenshot operation on an image frame corresponding to the first time information to acquire the first image frame corresponding to the identification of the live streamer user;

where, when the target live streamer user conducts a live stream competition with the other live streamer user, the image frame simultaneously displays live stream windows of the target live streamer user and the other live streamer user.

According to one or more embodiments of the present disclosure, the image processing module is configured to determine an image frame corresponding to the first time information as the first image frame, when the live stream type is a single-person live stream of the target live streamer user corresponding to the live stream room.

According to one or more embodiments of the present disclosure, the device further includes:

a controlling module, configured to control the client device to display the target effect information in full screen on an upper layer of live stream windows of the target live streamer user and the other live streamer user.

According to one or more embodiments of the present disclosure, the determining module is configured to:

perform a recognition operation on the first image frame to acquire the target object;

perform a data fusion operation on the target object and the first effect information to acquire the target effect information.

According to one or more embodiments of the present disclosure, the device further includes:

a detecting module configured to detect whether any one of client devices triggers a preset target operation in the live stream room in real time;

a time information determining module configured to determine second effect information corresponding to the target operation and second time information corresponding to the target operation if any one of the client devices triggers the preset target operation in the live stream room;

a sorting module configured to add the first and second effect information to a same message queue in chronological order according to the first time information and the second time information.

According to one or more embodiments of the present disclosure, the device further includes:

an effect acquiring module configured to sequentially acquire the first or second effect information in the message queue in chronological order, and determine the target effect information according to the first or second effect information, and the target object in the first image frame corresponding to the first time information or in the second image frame corresponding to the second time information.

In a fifth aspect, one or more embodiments of the present disclosure provide an effect display apparatus, including:

a content displaying module configured to display a streaming media content of a live stream room;

an effect determining module configured to determine, in response to detection of an effect trigger operation, first time information corresponding to the effect trigger operation, and determine first effect information corresponding to the effect trigger operation;

an instruction sending module configured to send an effect trigger instruction to a server, the effect trigger instruction indicating the first effect information, and the effect trigger instruction also indicating a first image frame corresponding to the first time information in the streaming media content of the live stream room;

an instruction acquiring module configured to acquire an effect display instruction from the server, the effect display instruction indicating target effect information, and the target effect information being associated with the first effect information and the target object in the first image frame; and an effect displaying module configured to display an effect corresponding to the target effect information.

In a sixth aspect, one or more embodiments of the present disclosure provide an effect display apparatus, including:

a content pushing module configured to push a streaming media content to a first client device and a second client device associated with a live stream room;

an instruction acquiring module configured to acquire an effect trigger instruction from the first client device, where the effect trigger instruction indicates target effect information, the target effect information is associated with first effect information and a target object in a first image frame in the streaming media content, the first effect information includes effect information corresponding to an effect trigger operation detected by the first client device, the effect trigger operation corresponds to first time information, and the first image frame includes an image frame corresponding to the first time information in the streaming media content of the live stream room; and a target effect sending module configured to send the target effect information to the second client device, so that the second client device displays an effect corresponding to the target effect information.

In a seventh aspect, one or more embodiments of the present disclosure provide an effect display device, including: a memory and a processor;

the memory is configured to store computer instructions;

the processor is configured to execute the computer instructions stored in the memory, so that the effect display device implements the effect display method according to the first aspect or the second aspect or the third aspect.

In an eighth aspect, one or more embodiments of the present disclosure provide a computer readable storage medium, where the computer-readable storage medium stores computer-executable instructions that, when executed by a computing device, cause the computing device to implement the effect display method according to the first aspect or the second aspect or the third aspect.

In a ninth aspect, one or more embodiments of the present disclosure provide a computer program product, including a computer program that, when executed by a processor, implements the effect display method according to the first aspect or the second aspect or the third aspect.

In a tenth aspect, one or more embodiments of the present disclosure provide a computer program that, when executed by a processor, implements the effect display method according to the first aspect or the second aspect or the third aspect.

In the effect display method, apparatus and device, storage medium, and product according to the present disclosure, the method involves: after acquiring an effect trigger instruction, generating target effect information according to first effect information and a first image frame in a streaming media content of a live stream room corresponding to the effect trigger instruction; sending the target effect information to a first client device associated with the live stream room, so that the first client device displays an effect corresponding to the target effect information. In this way, it is not necessary to perform an effect fusion operation on a live streamer's terminal device, and only needs to determine the first image frame and the first effect information, and then the synthesis of the target effect information and the display of the effect corresponding to the target effect information can be realized on the client device or server, and also the data in the live stream room will not block the effect corresponding to the target effect information.

The above descriptions are merely preferred embodiments of the present disclosure and an illustration of the technical principles employed. Those skilled in the art should understand that the disclosed scope involved in the present disclosure is not limited to the technical solutions formed by specific combinations of the above-mentioned technical features, and should also covers other technical solutions formed by any combinations of the above-mentioned technical features or their equivalent features without departing from the above-mentioned disclosed concept, for example, technical solutions formed by replacing the above features with the technical features with similar functions as disclosed (but not limited to these technical features) in the present disclosure.

Furthermore, although the operations are depicted in a specific order, it should not be interpreted as requiring that the operations are performed in particular order shown or in a sequential order. Under certain circumstances, multitasking and parallel processing may be advantageous. Similarly, although some specific implementation details are included in the above description, these should not be interpreted as limiting the scope of the present disclosure. Some features described in the context of individual embodiments can also be combined and implemented in a single embodiment. On the contrary, various features described in the context of a single embodiment can also be implemented in multiple embodiments individually or in any suitable sub combination.

Although the subject matter of the present disclosure has been described in language specific for structural features and/or method logical actions, it should be understood that the subject matter defined in the attached claims may not necessarily be limited to the specific features or actions described above. On the contrary, the specific features and actions described above are only exemplary forms of implementing the claims.

The invention claimed is:

1. An effect display method, comprising:

displaying a live stream of content;

receiving an effect trigger operation, wherein the effect trigger operation comprises a user watching the live stream of content presenting a virtual object to a live streamer user of the live stream;

generating, in response to the effect trigger operation, an effect trigger instruction, wherein the effect trigger instruction indicates effect information; and generating, in response to the effect trigger instruction, an effect, and displaying the effect, wherein the effect is generated based on the effect information corresponding to the effect trigger operation and a live stream image corresponding to the live stream of content, and the effect comprises an effect image corresponding to the effect information and the live stream image corresponding to the live stream of content, and the displaying the effect comprises displaying the effect on the live stream of content.

2. The method of claim 1, further comprising:

determining time information corresponding to a time at which the effect trigger operation is received.

3. The method of claim 2, wherein the time information comprises:

a time when the user watching the live stream of content presents the virtual object to the live streamer user of the live stream.

4. The method of claim 2, wherein the method further comprises:

acquiring an image frame corresponding to the time information in response to the effect trigger instruction triggered by the effect trigger operation.

5. The method of claim 4, wherein the live stream image is obtained based on the image frame.

6. The method of claim 2, further comprising:

in response to receiving the effect trigger operation and prior to displaying the effect, sending the effect trigger instruction to a server, the effect trigger instruction indicating an image frame corresponding to the time information in the stream content of the live stream.

7. The method of claim 6, further comprising:

after sending the effect trigger instruction to the server and prior to displaying the effect, acquiring an effect display instruction from the server, the effect display instruction indicating target effect information, and the target effect information being associated with the effect information and a target object image in the image frame.

8. The method of claim 1, wherein the live stream of content and the effect are displayed on a client device and the effect is generated on a server and received at the client device from the server.

9. The method of claim 1, wherein the live stream of content and the effect are displayed on a client device and the effect is generated on the client device.

10. The method of claim 1, further comprising:

in response to the effect trigger operation, determining time information corresponding to the effect trigger operation, determining an image frame corresponding to the time information in the live stream of content, and determining the effect information corresponding to the effect trigger operation.

11. The method of claim 1, wherein the effect trigger operation is a virtual object-gifting operation of the user watching the live stream of content.

12. An effect display device, comprising:

a memory and a processor, wherein the memory is configured to store computer instructions, and the processor is configured to execute the computer instructions stored in the memory, so that the effect display device implements the effect display method of claim 1.

13. A non-transitory computer-readable storage medium, wherein the computer-readable storage medium stores computer-executable instructions that, when executed by a computing device, cause the computing device to implement the effect display method of claim 1.

14. The method of claim 1, wherein the effect is displayed to both the user watching the live stream of content and the live streamer user of the live stream.

* * * * *